US009613398B2

United States Patent
Shih et al.

(10) Patent No.: US 9,613,398 B2
(45) Date of Patent: Apr. 4, 2017

(54) IMAGE DESCRIPTOR AND METHOD OF PATTERN RECOGNITION

(71) Applicant: YUAN-ZE UNIVERSITY, Zhongli, Taoyuan County (TW)

(72) Inventors: Huang-Chia Shih, Zhongli (TW); Kuan-Chun Yu, Zhongli (TW)

(73) Assignee: YUAN-ZE UNIVERSITY, Zhongli, Taoyuan County (TW)

( * ) Notice: Subject to any disclaimer, the term of this patent is extended or adjusted under 35 U.S.C. 154(b) by 37 days.

(21) Appl. No.: 14/661,232

(22) Filed: Mar. 18, 2015

(65) Prior Publication Data
US 2015/0269743 A1 Sep. 24, 2015

(30) Foreign Application Priority Data

Mar. 18, 2014 (TW) .............................. 103110068 A

(51) Int. Cl.
| | |
|---|---|
| *G06K 9/32* | (2006.01) |
| *G06T 3/60* | (2006.01) |
| *G06K 9/46* | (2006.01) |
| *G06K 9/50* | (2006.01) |

(52) U.S. Cl.
CPC .................. *G06T 3/60* (2013.01); *G06K 9/46* (2013.01); *G06K 9/50* (2013.01)

(58) Field of Classification Search
CPC ........... G06T 7/20; G06T 7/0012; G06T 3/60; G06K 9/18; G06K 9/20; G06K 9/32; G06K 9/228; G06K 9/6203; G06K 9/6423
See application file for complete search history.

(56) References Cited

U.S. PATENT DOCUMENTS

| 2006/0262876 A1* | 11/2006 | LaDue | ..................... H04B 7/00 375/295 |
| 2014/0003696 A1* | 1/2014 | Taghva | ................ A61B 5/0037 382/131 |
| 2015/0269743 A1* | 9/2015 | Shih | ........................ G06K 9/46 382/295 |

* cited by examiner

Primary Examiner — Amir Alavi
(74) Attorney, Agent, or Firm — Ming Chow; Sinorica, LLC

(57) ABSTRACT

Image description and image recognizable method, it contain (a) It obtain an image which possess plural pixels. (b) It determines a starting position in the image. (c) In the image, From the starting point along the trajectory of the former spiral aggregation makes a pixel sampling, and the pixel on the trajectory rank to the former spiral aggregation. (d) the angle increases with the increase of the variance, it forming a the angle of the latter spiral aggregation. From the starting point along a trajectory of the former spiral aggregation makes the pixel sample, and the pixel on the trajectory rank to the former spiral aggregation. (e) It decides how many frequencies the angle variation increase, and repeatedly performs the step (d). After obtaining a plurality of the latter spiral aggregation, the pixel corresponds to the value. (f) It ranks the former spiral aggregation and the latter spiral aggregation. Then, spiral aggregation map will be formed and recorded the every value of the pixel.

5 Claims, 7 Drawing Sheets

IMAGE DESCRIPTOR AND METHOD OF PATTERN RECOGNITION

FIELD OF THE INVENTION

The present invention relates to field of image processing, and more particularly to a recognizable image in rotation, image description in change and image recognizable method.

BACKGROUND OF THE INVENTION

Currently, the searching method is applied widely to web and appearance-based recognition, electronic component on circuit board, the license plates on the vehicle, building on a blank shot or a telemetry map and the cell in biological images etc.

As described above, in the images the first describe the particular block and the target figure. With the particular block and the matching similarity of the target figure, it will search similar or completely consistent goal figure in this images. And, the description of the image can be directed against color or gray scale images.

Although the color images and gray scale images can be matched. But, the description of the gray scale images is less information than the color it. Therefore, it should ease the operative burden during the Image matching process.

In the tradition, the gray scale images are two kinds of description method, ring Projection Transformation and Radial Projection Transformation. As has been said before, two descriptions are won advantage, but those are some defect.

For example, the ring conversion had an advantage of the anti-rotation. But, the disadvantage is not applicable in Circular symmetry or radiation from center to outside. The Circular conversion should be sampled by a ring shaped manner. Otherwise, it is easy to get to the same information in the same directions, and loss a radial direction.

In view of the aforesaid, the present invention supplies an image recognizable method. There are not only maintain the annular conversion and the advantage of the radial transition, also resist image change size and find the angle change after rotating around.

SUMMARY OF THE INVENTION

A first aspect of the invention is to provide an image descriptions, it is spiral aggregation track to depict the new spiral aggregation map. To achieve against the images rotate, move and change.

A second aspect of the invention is to provide an image description, as previously stated, with image description establish an image description model to identify an image object type.

A third aspect of the invention is to provide an image description. With a decision of the three steps, the decisive process is simple to plurality of. Image objects filter out a sub image that is similar the image description model.

In order to achieve the above and other objectives, the present invention provides to an image description method. It includes (a) Obtaining an image which possess plural pixels. (b) Determining a starting position in the image. (c) In the image, From the starting point along the trajectory of the former spiral aggregation makes a pixel sampling, and the pixel on the trajectory rank to the former spiral aggregation. (d) the angle increases with the increase of the variance, it forming a the angle of the latter spiral aggregation. From the starting point along the trajectory of the former spiral aggregation makes the pixel sample, and the pixel on the trajectory rank to the former spiral aggregation. (e) Deciding how many frequency the angle variation increase, and repeatedly performs the step (d). After obtaining a plurality of the latter spiral aggregation, the pixel corresponds to the value. (f) Ranking the former spiral aggregation and the latter spiral aggregation. Then, spiral aggregation map will be formed and recorded the every value of the pixel.

In order to achieve the above and other objectives, the present invention provides to an image description method. Using an image description model establish an image description model to identify the image object. The image object has a plurality of pixels, and image description model is provided with spiral aggregation map. The method comprises step (a) Image object model based on the size of the image description. Step (b) the center of contrast area is corresponding to one of the pixel. The angle of the spiral aggregation track samples a first contrast area, the pixel sampled is corresponding to a value. Wherein, the value can be an average of the pixel or come into second or higher level values. Step (c) Comparing a value and the value of spiral aggregation map, wherein, it forms a numerical distribution. Step (d) Determining the value within a distribution and record the coordinates which the center point correspond to pixel. Next, step (e) compared area moves to next pixel and implement step (d). Until all regions of an image object to complete the scan.

In the other embodiment, after step (d), step (f) Removing the recorded central point, to determine the second compared area. Step (g) in the second compared are, a plurality of spiral aggregation track samples the pixel. And, it should be a plurality of values. This value can be an average of the pixel or come into second or higher level values. Step (h) Comparing the value and spiral aggregation map are corresponding to the value, among spiral aggregation map contain the value and Interval number of different values frequency. And, step (i) Deciding the value in interval number of different values, and record that the center point is corresponding to the pixel coordinates.

In the further embodiment, after step (i) to step (j) Removing the recorded central point, to determine the third compared area. Step (k) In the third compared are, a plurality of spiral aggregation track samples the pixel. And, it is one of the pixels in spiral aggregation map. Step (l) Calculating the projective amount of the vertical direction in the spiral aggregation map and the compared spiral aggregation map, and Calculating the projective amount in the spiral aggregation map and the pixels. It determines a feature of the points. Step (m) calculating the projective amount of the horizontal direction in the spiral aggregation map and the compared spiral aggregation map. It determines a rotation of the angle. And, step (n) According to the feature of the points and the rotation of the angle, it determines the relationship between the image description model and spiral aggregation map.

Compared to conventional technology, the present invention provides to an image descriptive method and utilizing the image descriptive method executes image recognizable method. The image descriptive method can retain the structural of the image and continuous information. Because the image descriptive model contain more subtle information about images. Therefore, it retains the simultaneously advantages of an annular projection transformation and a radial projection transformation. To achieve against the images rotate, move and change.

DETAILED DESCRIPTION OF THE PREFERRED EMBODIMENTS

As indicated above, the invention provides a scenario-based security method and system. The following comprises preferred embodiments of the invention, which describe different aspects of the present invention.

Figure 1:
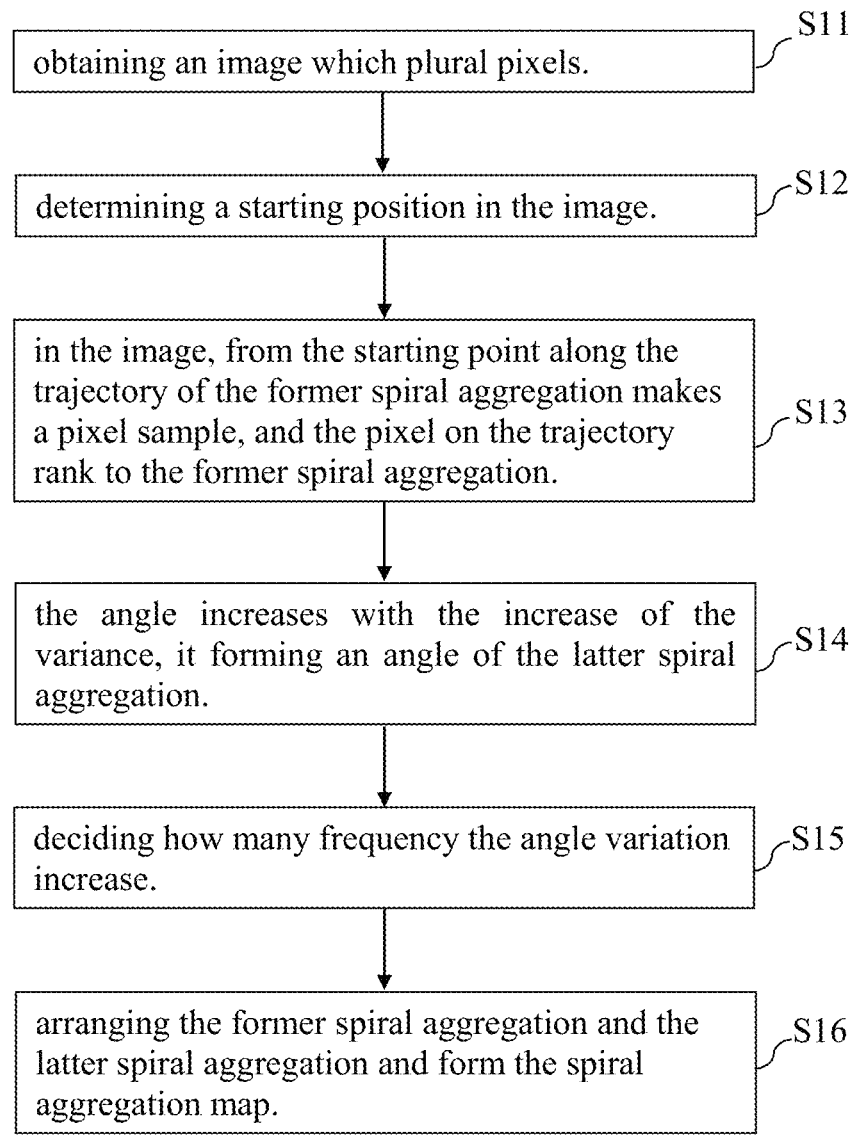
FIG. 1 is the flow diagram about the image according to an embodiment of the present invention.
Figure 2:
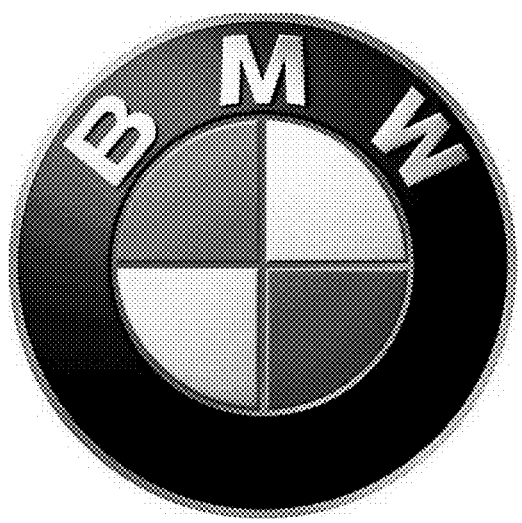
FIG. 2 explains FIG. 1 image schematic diagram according to an embodiment of the present invention.

Referring to in FIG. 1 that is the flow diagram about the image description method of the present invention. In FIG. 1, Image descriptive method begins from step S11. As shown in FIG. 2, it obtains an image which plural pixels.

Step S12, determine a starting position in the image. For example, the staring position is general on the center of the image.

Step S13, in the image, from the starting point along the trajectory of the former spiral aggregation makes a pixel samples, and the pixel on the trajectory rank to the former spiral aggregation.

In the specific examples, spiral aggregation definition is the dot on the spiral aggregation track. From one point has a fixed speed to the next point. It stars from the center point until the periphery finished. The spiral aggregation refers Archimedes screw geometry theorems. With the projection method formed spiral aggregation track, and it establish the image descriptive. In the characteristic of the spiral aggregation, when spiral aggregation extends outward from the center, its displacement in horizontal and vertical direction will be conducted at the same time. With the projection in the horizontal direction and vertical direction can understand the structure of the image component.

Step S14, the angle increases with the increase of the variance, it forming an angle of the latter spiral aggregation. From the starting point along the trajectory of the former spiral aggregation makes a pixel sample, and the pixel on the trajectory rank to the former spiral aggregation. For example, the variance range is between 0.5 and 1 degree.

Step S15, deciding how many frequency the angle variation increase, and repeatedly performs the step S14. It obtains a plurality of the latter spiral aggregation. For example, the frequent range is between 1 and 720 times.

Figure 3:
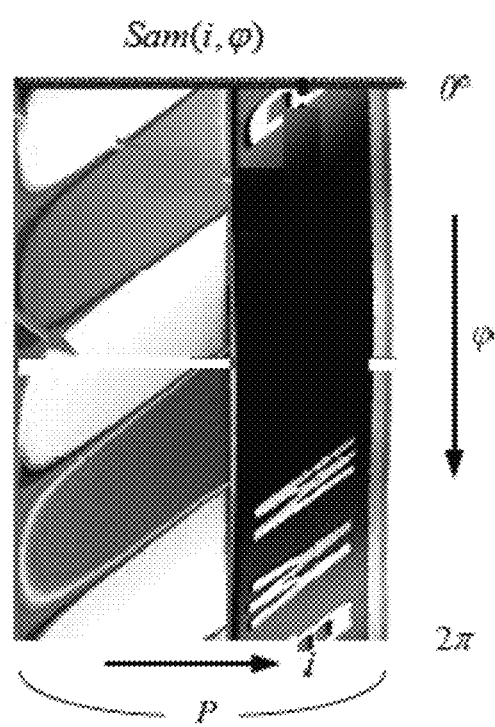
FIG. 3 explains FIG. 1 spiral aggregation map according to an embodiment of the present invention.

By repeating Step S14 and Step S15, the former spiral aggregation and the latter spiral aggregation rank sequentially and vertically in spiral aggregation map, as shown in FIG. 3. For example, spiral aggregation map is a rectangle. The former spiral aggregation and the latter spiral aggregation form side of the rectangles, and another side of rectangle is ranked from those pixel sampling. The detailed content will be described as blow.

Step S16, arranging the former spiral aggregation and the latter spiral aggregation and form the spiral aggregation map. In other embodiment, the former spiral aggregation and the latter spiral aggregation rank sequentially and vertically in spiral aggregation map.

In FIG. 3, spiral aggregation map is made from every pixel which are on different angles of spiral aggregation track. The spiral aggregation map is defined as Sam(i, φ). Function indicates that the i-th pixel in the trajectory of the φ spiral aggregation, and spiral aggregations are on the basis of the φ order to rank it. In FIG. 3, horizontal direction is made from all pixels i in one spiral aggregation track. The range of pixel i is between 1 and p times. Wherein, P represents the total number of samples for the one spiral aggregation In addition, if spaced distribution rate of every spiral aggregation is $\Delta \phi$ angles. Thus, spiral aggregation map will get $2\pi/\Delta\phi$ spiral aggregation in total.

Figure 4:
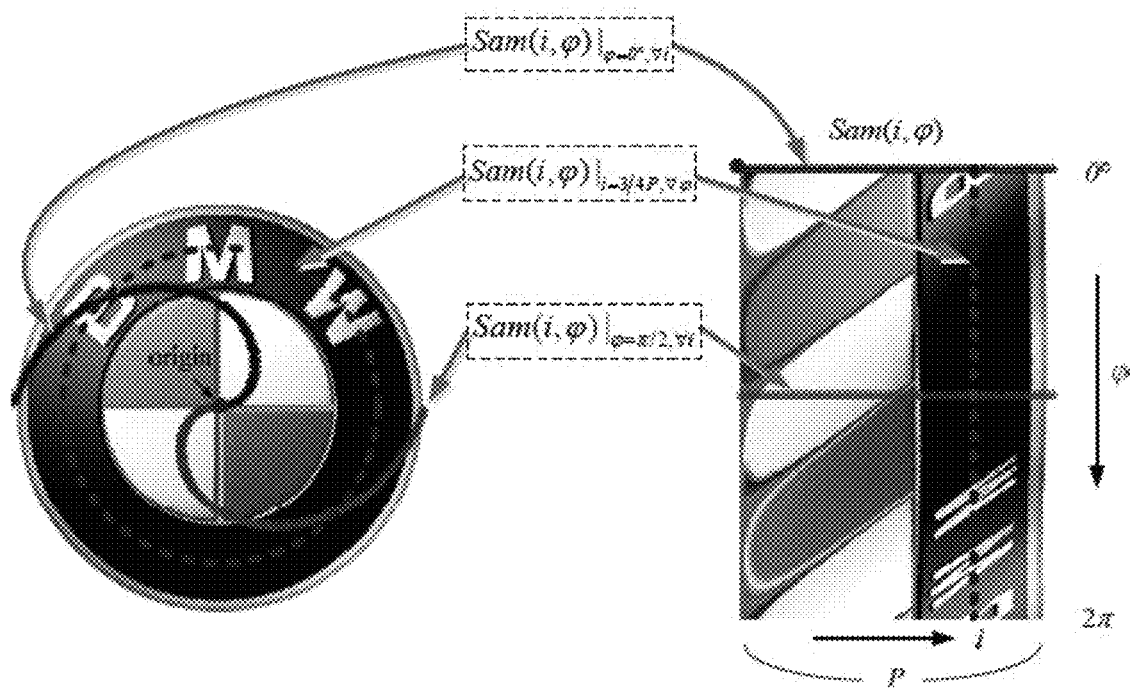
FIG. 4 contrast diagram about the image description method with spiral aggregation map according to an embodiment of the present invention.

Referring to FIG. 4, there is the contrast diagram about the image with spiral aggregation map. In FIG. 4, the two Spiral aggregations are worth a concern. One is φ that the vertical line of the zero degree, another is φ that the vertical line of the $\pi/2$ degree (the 90 degree). The spiral aggregation indicated that the horizontal direction of spiral aggregation map. If we take a vertical line in the vertical direction, it indicates that after each rotation of the spiral aggregation, the i-th pixel of the pooled. In conclusion, if the combination of all the vertical lines forms annular projective amount of the image. According to the definition of the geometry spiral theorem, there is the same spiral sampling. So, spiral aggregation will not be affected the track which is made of spiral aggregations by change the size of the image.

In conclusion, spiral aggregations have two important features. First, it can resist to image size change. Because, when the size is changed, the image will maintain almost the same appearance in the vertical projection of spiral aggregations Map. Second, the rotation can be predicted. For example, after the image is rotated, will show the direction of the vertical displacement on spiral aggregations Map. With the displacement of the change quantity and direction, it can find out the differences in the direction and angle between the rotated image and the does not rotate image.

Figure 5:
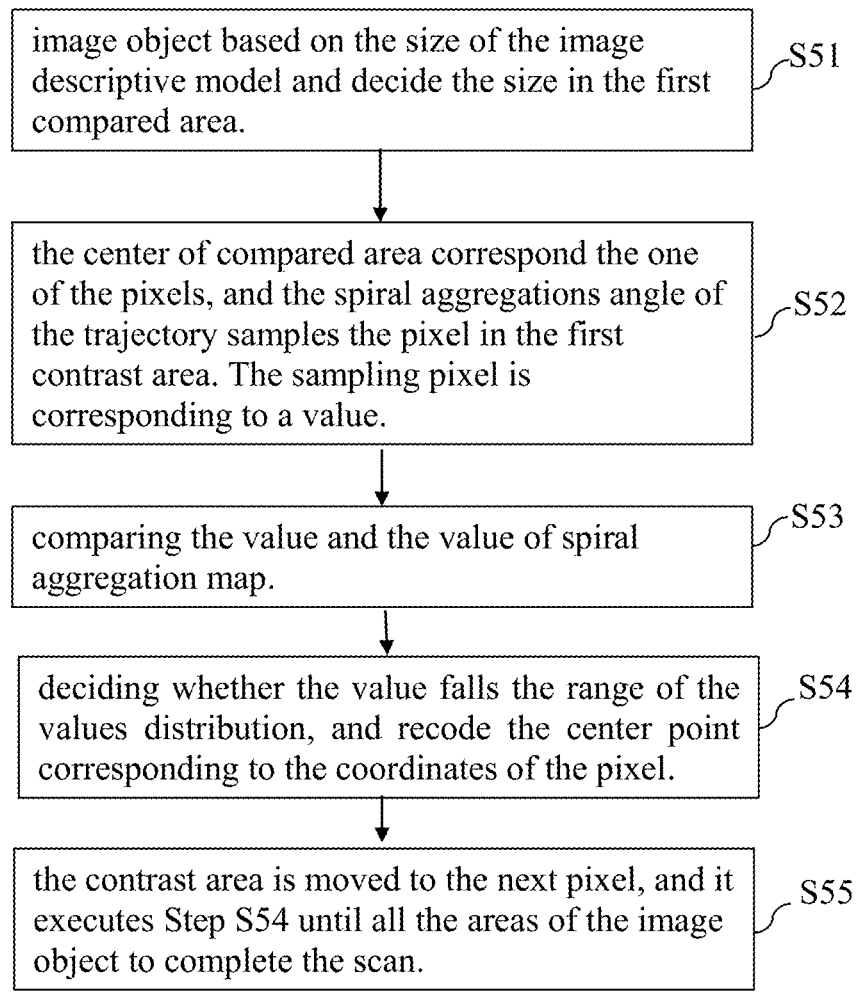
FIG. 5 is the flow diagram about the image description method according to an embodiment of the present invention.

Referring to FIG. 5 is the flow diagram about the image description of the present invention. In FIG. 5, image recognizable method supplies the image descriptive method to establish the image descriptive model and identify the image object. It is a plural pixel, and the image descriptive model possesses the spiral aggregations Map. The method star from step S51. Image object based on the size of the image descriptive model and decide the size in the first compared area.

Step S52, the center of compared area correspond the one of the pixels, and the spiral aggregations angle of the trajectory samples the pixel in the first contrast area. The sampling pixel is corresponding to a value.

Step S53, comparing the value and the value of spiral aggregation map. The value of spiral aggregation map forms a numerical distribution.

Step S54, deciding whether the value falls the range of the values distribution, and recode the center point corresponding to the coordinates of the pixel.

Step S55, the contrast area is moved to the next pixel, and it executes Step S54 until all the areas of the image object to complete the scan.

Figure 6:
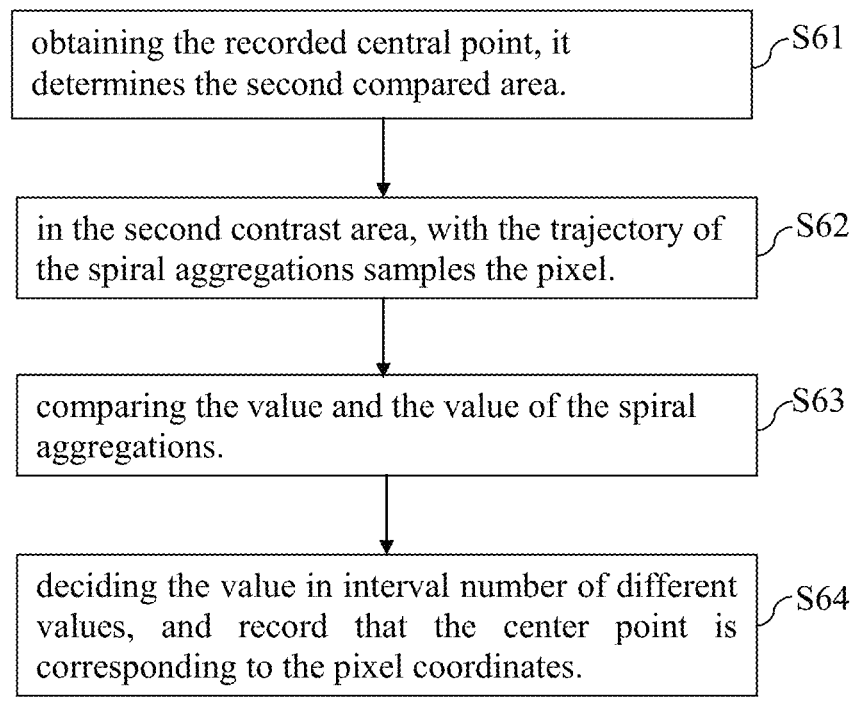
FIG. 6 is another flow diagram about the image description method according to an embodiment of the present invention.

FIG. 6 is another flow diagram about the image description of the present invention. After step S55 to step S61. By obtaining the recorded central point, it determines the second compared area.

Step S62, in the second contrast area, with the trajectory of the spiral aggregations samples the pixel. The pixels is corresponding the plural values. It's worth that each spiral aggregations present sparse shape. The spiral aggregation which was selected is a representative and its image with a general description. For example, the number of spiral aggregation is 4. The two adjacent spiral aggregations differ from the 90 degree.

Step S63, comparing the value and the value of the spiral aggregations. The Spiral Aggregations Map includes a value and a set of interval number of different values.

Step S64, deciding the value in interval number of different values, and record that the center point is corresponding to the pixel coordinates.

Figure 7:
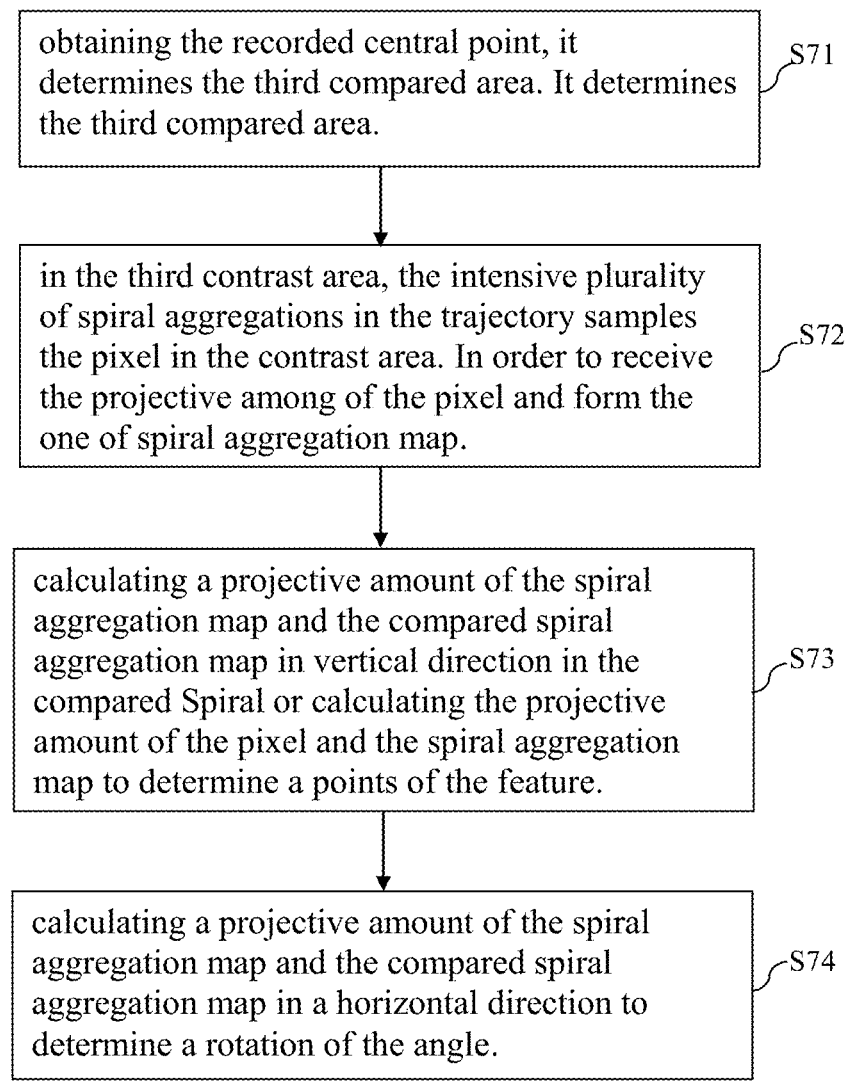
FIG. 7 is flow diagram about the image description method according to an embodiment of the present invention.

FIG. 7 is flow diagram about the image description of the present invention. After step S64 to step S71. By obtaining the recorded central point, it determines the third compared area. It determines the third compared area.

Step S72, in the third contrast area, the intensive plurality of spiral aggregations in the trajectory samples the pixel in the contrast area. In order to receive a projective among of the pixel and form the one of spiral aggregation map. It is worth to understand that each spiral aggregations present dense shape, and the image can be completely described. For example, the number of spiral aggregation is 360. The two adjacent spiral aggregations differ from a predetermined angle. For example, this angle is 1 degree °

Step S73, calculating the projective amount of the vertical direction in the compared spiral aggregation map and the spiral aggregation map, and calculating the projective amount of pixel and the spiral aggregation map. It determines the points of the feature. It can decide the center position in the image.

Step S74, calculating the projective amount of the horizontal direction in the compared spiral aggregation map and the spiral aggregation map. It determines the rotation of the angle.

Step S75, according to the points of the feature and the angle of the rotation, it decides the relationship between the image descriptive model and spiral aggregations Map.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. An image descriptive method comprises:
(a) obtaining an image, wherein the image having a plurality of pixels;
(b) determining a starting point in the image;
(c) sampling the plurality of pixels from the starting point along a trajectory of a former spiral aggregation with a former angle in the image, and arranging the plurality of pixels on the trajectory to form a former spiral aggregation;
(d) forming a latter spiral aggregation with a latter angle after increasing an angle variation in the former angle, and sampling the plurality of pixels form the starting point along the trajectory of the latter spiral aggregation, and arranging the plurality of pixels on the trajectory to form a latter spiral aggregation;
(e) deciding a frequency of the increased variance for repeatedly performing the step (d) for obtaining a plurality of the latter spiral aggregation, wherein the plurality of pixels correspond to a value; and
(f) arranging the former spiral aggregation and the latter spiral aggregation form a spiral aggregation map, and recording the value of each the plurality of pixels.

2. An image descriptive method of claim 1, wherein a range of the frequent is between 1 and 720 times.

3. An image descriptive method of claim 2, wherein a range of angle variation is between 0.5 and 1 degree.

4. An image descriptive method of claim 1, wherein the starting point is located at a center of the image.

5. An image descriptive method of claim 1, wherein in step (f), the former spiral aggregation and the latter spiral aggregation are arranged sequentially and vertically to the spiral aggregation map.

* * * * *